US006179192B1

(12) United States Patent
Weinger et al.

(10) Patent No.: US 6,179,192 B1
(45) Date of Patent: Jan. 30, 2001

(54) FASTENER DRIVING TOOL FOR TRIM APPLICATIONS

(75) Inventors: Murray Weinger, Green Oaks; Patrick J. Driscoll, Prospect Heights; Robert S. Buetow, Lake in the Hills; William E. Richardson, Rolling Meadows, all of IL (US)

(73) Assignee: Illinois Tool Works Inc., Glenview, IL (US)

(*) Notice: Under 35 U.S.C. 154(b), the term of this patent shall be extended for 0 days.

(21) Appl. No.: 09/329,452

(22) Filed: Jun. 10, 1999

Related U.S. Application Data

(62) Division of application No. 09/063,149, filed on Apr. 20, 1998, now Pat. No. 6,016,622.

(51) Int. Cl.$^{7}$ ..................................................... H01M 2/10

(52) U.S. Cl. ............................. 227/8; 173/171; 227/130; 227/156; 429/97

(58) Field of Search ............................... 227/8, 130, 131, 227/156, 126; 173/171, 217; 310/47, 50; 30/DIG. 1; 429/97, 100

(56) References Cited

U.S. PATENT DOCUMENTS

| | | | |
|---|---|---|---|
| Re. 32,452 | 7/1987 | Nikolich | 123/465 C |
| 3,519,186 | 7/1970 | Volkmann | 227/8 |
| 4,050,003 * | 9/1977 | Owings et al. | 310/50 |
| 4,146,682 * | 3/1979 | Nakao | 429/97 |
| 4,197,974 | 4/1980 | Morton et al. | 227/8 |
| 4,403,722 | 9/1983 | Nikolich | 227/8 |
| 4,408,261 | 10/1983 | Polakoff | 362/104 |
| 4,441,000 | 4/1984 | Suwa | 200/16 D |
| 4,463,888 | 8/1984 | Geist et al. | 227/126 |
| 4,483,473 | 11/1984 | Wagdy | 227/8 |
| 4,483,474 | 11/1984 | Nikolich | 227/8 |
| 4,504,890 | 3/1985 | Chan | 200/60 |
| 4,506,119 | 3/1985 | Tanabe | 200/16 C |
| 4,517,628 | 5/1985 | McDermott | 362/186 |
| 4,552,162 | 11/1985 | Finger | 134/57 |
| 4,570,208 | 2/1986 | Sassmannshausen | 362/188 |
| 4,597,517 | 7/1986 | Wagdy | 227/8 |
| 4,636,596 | 1/1987 | Takada | 200/60 |
| 4,698,613 | 10/1987 | Okuya | 200/16 D |

(List continued on next page.)

*Primary Examiner*—Peter Vo
*Assistant Examiner*—Jim Calve
(74) *Attorney, Agent, or Firm*—Schwartz & Weinrieb

(57) ABSTRACT

An improved fastener driving tool is provided that is especially adapted to the application of fasteners in trim applications, such as the fastening of wood trim and decorative pieces. The preferred embodiment is a combustion tool, and includes an incrementally adjustable fastener driving depth setting mechanism. The incremental control permits an operator to select from a number of discrete depth settings over a limited range. The preferred tool also includes a distance amplifying fastener lockout. The lockout amplifies a fastener follower movement permitting the blocking of movement of a linkage necessary to tool operation in response to the movement associated with an individual small fastener being dispensed. A trigger and handle of the preferred tool are proximate to the driver blade axis, and the trigger is disposed within an imaginary extension of a fuel canister held within the tool housing. A unique fastener magazine extends into the nosepiece, includes ribs for holding separate pieces of the tool housing together, and includes a solid bottom portion preventing exposure of fasteners held in the tool. An elongated joining element serves to hold the housing pieces together along the front of the tool, and provides a sight permitting an operator to properly align the tool over a workpiece. A battery holder in the tool includes separate locked operational and standby positions. The standby position prevents contact with tool circuits so as to electrically disable the tool.

20 Claims, 10 Drawing Sheets

U.S. PATENT DOCUMENTS 4,700,876 10/1987 Wingert ................................ 227/156
4,717,060 1/1988 Cotta ...................................... 227/10
4,748,544 5/1988 Ince ...................................... 362/203
4,767,043 8/1988 Canlas, Jr. ............................... 227/8
4,779,687 * 10/1988 Schreiber et al. .................. 173/171
4,834,278 * 5/1989 Lin ...................................... 227/131
4,841,105 6/1989 Goodman et al. ..................... 200/16
4,841,417 6/1989 Maglica et al. ...................... 362/206
4,858,813 8/1989 Wingert ................................ 227/156
4,934,494 6/1990 Fushiya et al. ........................ 192/34
5,158,358 10/1992 Maglica ............................... 362/206
5,197,647 * 3/1993 Howell ................................ 227/126
5,208,525 * 5/1993 Lopic et al. ........................... 310/50
5,213,913 * 5/1993 Anthony, III et al. ................. 429/97
5,219,110 6/1993 Mukoyama .............................. 227/8
5,263,439 11/1993 Doherty et al. .................. 123/465 C
5,298,821 * 3/1994 Michel .................................. 310/50
5,361,853 11/1994 Takamura et al. ................... 173/217
5,379,197 1/1995 Conyers et al. ....................... 362/72
5,385,286 1/1995 Johnson, Jr. ............................ 227/8
5,401,592 * 3/1995 Gilpin et al. ........................... 429/97
5,415,955 * 5/1995 Kobayashi et al. .................... 429/97
5,433,367 7/1995 Liu ...................................... 227/120
5,553,675 * 9/1996 Pitzen et al. ......................... 173/217
5,590,951 1/1997 Matthews ............................. 362/205
5,621,618 * 4/1997 Komiyama ............................. 429/97
5,633,096 5/1997 Hattori ................................ 429/100
5,635,296 6/1997 Nakayama et al. .................. 428/332
5,680,980 10/1997 Robinson ............................ 227/130
5,685,473 11/1997 Shkolnikov et al. .................... 227/8
5,816,469 10/1998 Ohuchi ................................ 227/156
5,839,638 11/1998 Ronn ....................................... 227/8

* cited by examiner

FASTENER DRIVING TOOL FOR TRIM APPLICATIONS

This patent application is a Divisional patent application of prior U.S. patent application Ser. No. 09/063,149, which was filed on Apr. 20, 1998, now U.S. Pat. No. 6,016,622.

FIELD OF THE INVENTION

The present invention relates generally to improvements in fastener driving tools, and specifically to improvements relating to the useability and functionality of such tools for the installation of trim, and other decorative and finishing applications utilizing small fasteners and small workpieces, which will be collectively referred to herein as "trim applications". The tool of the invention includes a number of improved features especially suitable to provide enhanced operation and user comfort when using the tool in trim applications, while also improving ease of tool assembly. Preferably, the tool is a combustion powered tool, but aspects of the present invention are similarly applicable to other tools, such as pneumatically powered and powder actuated tools.

BACKGROUND OF THE INVENTION

Portable combustion powered tools for use in driving fasteners into workpieces are described in commonly assigned patents to Nikolich, U.S. Pat. Re. No. 32,452, and U.S. Pat. Nos. 4,552,162, 4,483,473, 4,483,474, 4,403,722, and 5,263,439, all of which are incorporated herein by reference. Similar combustion powered nail and staple driving tools are available commercially from ITW-Paslode under the IMPULSES® brand.

Such tools incorporate a generally gun-shaped tool housing enclosing a small internal combustion engine. The engine is powered by a canister of pressurized fuel gas, also called a fuel cell. A battery-powered electronic power distribution unit produces the spark for ignition, and a fan located in the combustion chamber provides for both an efficient combustion within the chamber, and facilitates scavenging, including the exhaust of combustion by-products. The engine includes a reciprocating piston having an elongate, rigid driver blade disposed within a piston chamber of a cylinder body.

The wall of a combustion chamber is axially reciprocable about a valve sleeve and, through a linkage, moves to close the combustion chamber when a workpiece contact element at the end of a nosepiece connected to the linkage is pressed against a workpiece. This pressing action also triggers a fuel metering valve so as to introduce a specified volume of fuel gas into the closed combustion chamber from the fuel cell. The metering valve may take the form of a solenoid valve, which is powered by the battery, or may be a purely mechanical valve.

Upon the pulling of a trigger, which causes the ignition of a charge of gas in the combustion chamber of the engine, the piston and driver blade are shot downward so as to impact a positioned fastener and drive it into the workpiece. As the piston is driven downward, a displacement volume enclosed in the piston chamber below the piston is forced to exit through one or more exit ports provided at the lower end of the cylinder. After impact, the piston then returns to its original, or "ready" position through differential gas pressures within the cylinder. Fasteners are fed into the nosepiece from a supply assembly, such as a magazine, where they are held in a properly positioned orientation for receiving the impact of the driver blade. The power of the tools differs according to the length of the piston stroke, the volume of the combustion chamber, the fuel dosage and similar factors.

The combustion powered tools have been successfully applied to large workpieces requiring large fasteners, for framing, roofing and other heavy duty applications. Smaller workpiece and smaller fastener trim applications demand a different set of operational characteristics than the heavy-duty, "rough-in", and other similar applications.

One operational characteristic required in trim applications is the ability to predictably control fastener driving depth. For the sake of appearance, some trim applications require fasteners to be countersunk below the surface of the workpiece, others require the fasteners to be sunk flush with the surface of the workpiece, and some may require the fastener to stand off above the surface of the workpiece. Depth adjustment has been achieved in pneumatically powered and combustion powered tools through a tool controlling mechanism, referred to as a drive probe, that is movable in relation to the nosepiece of the tool. Its range of movement defines a range for fastener depth-of-drive. Exemplary depth adjustment tool-controlling mechanisms are disclosed in Volkmann U.S. Pat. No. 3,519,186, Canlas, Jr., U.S. Pat. No. 4,767,043, Mukoyama U.S. Pat. No. 5,219,110, and Johnson, Jr., U.S. Pat. No. 5,385,286.

Another depth-of-drive adjustment having a spool on a thread for adjusting depth is disclosed in commonly assigned U.S. Pat. 5,685,473. The spool has ribs that engage a spool restraining element when the tool controlling mechanism is pressed inwardly toward the tool body. This prevents spool movement when the tool is enabled for firing. In these prior depth adjustment mechanisms, the operator typically obtains a desired depth through trial and error. If the depth is altered for some reason, it may take additional trial and error to return to a previously used depth. This experimentation to obtain a desired depth slows the operation of the tool, and may result in workpiece damage in trim applications which require a precisely controlled depth.

Another difficulty in trim applications relates to the small fasteners used. Typically, these fasteners are fed into the nosepiece by a magazine which is angularly mounted below the handle used by an operator to grip and trigger the gun. They are advanced by a spring loaded fastener pusher, generally similar in operation to those found in staplers. It is preferable to prevent firing when a certain number of fasteners are remaining, or when the fasteners are exhausted, but the resulting movements created in the magazine by trim sized fasteners provide very little mechanical feedback due to their small size. For example, typical finishing brads loaded into a magazine move in increments of about 0.060" (1.5mm). As a result, a lockout bar moving with the brads is unable to block the larger diameter drive probe and related linkage, used to enable firing, upon the movement induced after the driving of a small diameter brad.

The fasteners used in trim applications may also be difficult to manipulate and load due to their small size. Rear loading, top loading, and side loading arrangements are known in the art. The side and top loading arrangements are more mechanically complex since the direction in which the fasteners are loaded into the magazine is not in the same direction into the nosepiece that the fasteners travel during operation. The known rear loading arrangement is more easily implemented, but is more difficult to use because no portion of the gun provides a guiding surface for a user to align a fastener, or the beginning of a group of fasteners, with the opening for placing fasteners into the magazine.

User ergonomics and tool balance also play a more pronounced role in trim applications. Manipulation of the tool to fasten horizontally disposed trim pieces and trim pieces in awkward positions results in user fatigue, which is amplified by a tool which is not balanced around the user grip area. Typical combustion tools have the handle disposed away from the axis of the driver blade so as to accommodate the fuel cell held in the housing at a point adjacent to the termination of the handle at the housing. This results in a natural tendency of the tool to lean away from the user when gripped at the handle since most of the tool's weight is centered near the axis of the driver blade. Recoil is also pronounced since the distance between the handle and the driver acts as a moment arm. A user must oppose these forces when using the tool, resulting in fatigue.

User comfort is also affected by tool weight and stability. Typically, the fastener driving tools are held together by numerous screws and rivets at various points around the tool's periphery. This increases weight and decreases rigidity. Since the magazine and tool housing are separate pieces, the separate fastening also can lead to alignment problems in delivering fasteners into the nosepiece. These operational problems are separate from additional assembly problems related to the same typical tool features, which make assembly more difficult and expensive.

Trim applications also require more exacting positioning during firing. Typical tools obscure an operator's sight line since the body of the tool interferes with the view to a portion of the workpiece proximate to the point at which the fastener will be driven into the workpiece.

Tools having self contained power sources generally must also be portable, and cost is an important concern. To keep cost and weight down, many portable tools lack an on/off switch. To prevent unintentional operation of the tool, some operators disengage the battery held in the handle or some other portion of the tool. In combustion tools, the battery is necessary to produce the spark and fan movement necessary to tool operation. If the operator is moving, for instance by climbing a ladder or scaffold, the loosely held disconnected battery (or batteries) may fall out. This is an inconvenience to the operator, a cause of damage to the battery, and a potential hazard to the operator and anyone below the operator.

OBJECTS OF THE INVENTION

Accordingly, it is an object of the present invention to provide an improved fastener driving tool useful for the driving of fasteners in trim applications and which addresses drawbacks in conventional fastener driving tools.

Another object of the present invention is to provide an improved fastener driving tool in which fastener drive depth may be incrementally set so as to produce repeatable fastener depth settings. A related object of the present invention is to provide an improved fastener driving tool having a drive probe adjustment including a polygonal surface cooperating with a spring loaded detent, such as a ball so as, to provide discrete incremental adjustments of the drive probe.

A further object of the present invention is to provide an improved combustion powered fastener driving tool wherein the handle and trigger are moved inwardly toward the driver blade so as to provide a more balanced operational position. A related object of the invention is to provide an improved combustion powered tool having the trigger positioned within an imaginary extension of the fuel cell close to the tool's center of gravity.

An additional object of the present invention is to provide an improved fastener driving tool for trim applications which prevents tool operation when a predetermined number of small fasteners remain in the magazine. A related object of the invention is to provide an improved tool with a distance amplifying lockout which multiplies the mechanical movement associated with the movement of the fasteners in the magazine after the driving of a fastener so as to block the drive probe and linkage from moving into an operational position.

A still further object of the present invention is to provide an improved fastener driving tool for trim applications which has a magazine which is shaped to act as a connection member at the bottom of the tool so as to hold separate portions of the tool housing together. Related objects of the invention include the provision of a magazine which extends into the nosepiece, the provision of a magazine having ribs for accepting pieces of the housing, and the provision of a magazine having a closed bottom so as to prevent exposure of the fasteners.

An additional object of the present invention is to provide an improved fastener driving tool for trim applications having a rear loading magazine under the tool's handle, the tool having a loading shelf defined by an extended portion of one of the tool housing pieces so that the shelf aids in fastener loading.

Yet another object of the present invention is to provide an improved fastener driving tool for trim applications which includes an elongated joining element for holding the separate housing pieces together along the front of the tool, the joining element including a sight permitting an operator to position the tool over a workpiece.

Still another object of the present invention is to provide an improved fastener driving tool for trim applications which has a battery holder including a locked standby position, permitting the battery to be moved into a locked position which is out of electrical contact with tool operational circuits. A related object of the invention is to provide a tool with a battery holder which is movable between separate locked operational and standby positions, and which includes an indicator to indicate to an operator the position of the battery holder.

SUMMARY OF THE INVENTION

The above-listed objects are met or exceeded by the present improved fastener driving tool, which is especially suited to trim applications. The tool of the present invention includes features aiding in the operation, ergonomics, and assembly of the tool. According to one feature of the present invention, the fastener driving depth may be incrementally set. In the preferred embodiment, a drive probe adjustment mechanism includes a polygonal shaped surface with a detent comprising a spring loaded ball riding on the surface. Operator adjustment results in incremental "clicks" indicating distinct incremental positions which may be easily reproduced. To facilitate prevention of firing when a certain number of small fasteners remain, the preferred tool also includes a distance amplifying lockout. The lockout is pivotally mounted and is engaged by a rod that is part of a fastener follower when a predetermined number of fasteners remain. An engagement end is located further from the pivot point than a rod contact point so as to provide a significant amplification in movement. The amplification is sufficient to move the engagement end into a position so as to prevent the tool's drive probe and linkage from being placed into an operational position after a single fastener has been expended.

The preferred tool also includes a modified trigger and handle assembly. The handle and trigger are moved inward toward the driver axis as compared to a conventional tool. This improves tool balance and user comfort.

In the preferred embodiment, the fastener magazine provides a unitary path for fasteners into the nosepiece, and serves to hold together separate portions of the housing for the tool. The magazine includes ribs for accepting the separate halves of the housing, which lock into the ribs so as to bind the housing portions together. The magazine preferably includes a closed aluminum bottom so as to keep the fastener tips from being exposed. An elongated joining element serves to similarly act as an assembly point along the front of the tool. The element includes a rib which acts as a sight for the operator to properly position the tool over a workpiece. Alternatively, a rifle type sighting aid may be used in place of the rib. Separately and in combination, the magazine and joining simplify assembly and improve tool rigidity and component alignment.

Preferably, one of the housing portions extends more than the other at a rear portion where the magazine terminates with an opening into which fasteners may be loaded. This extended portion provides a fastener loading shelf. The shelf acts as a guide to assist an operator in the loading of fasteners into the magazine opening.

An additional advantage of the preferred tool is the battery holder, which includes separate locked standby and operational positions. An operator may move the battery into the locked standby position so as to remove the battery (or batteries) from electrical contact with the electrical circuits of the tool. The battery holder may include an "off" or similar indication for when the battery holder is placed in the standby position, or an "on" or similar indication when the battery holder is in the operational position. When placed in the standby position, the battery is still held securely in the tool so that the tool may be easily transported.

BRIEF DESCRIPTION OF THE DRAWINGS

Other features, objects and advantages of the invention will be apparent by reference to the following detailed description and the drawings, in which like reference characters designate like or corresponding parts throughout the several views, and wherein.

DETAILED DESCRIPTION OF THE PREFERRED EMBODIMENT

Broadly stated, the present invention concerns an improved fastener driving tool that is especially suited for installation of trim, and other decorative and finishing applications utilizing small fasteners and small workpieces, which will be collectively referred to herein as "trim applications". The tool of the invention is maneuverable and comfortable, it provides repeatable depth control, and includes a number of features which render use and assembly more efficient and reliable.

Figure 1:
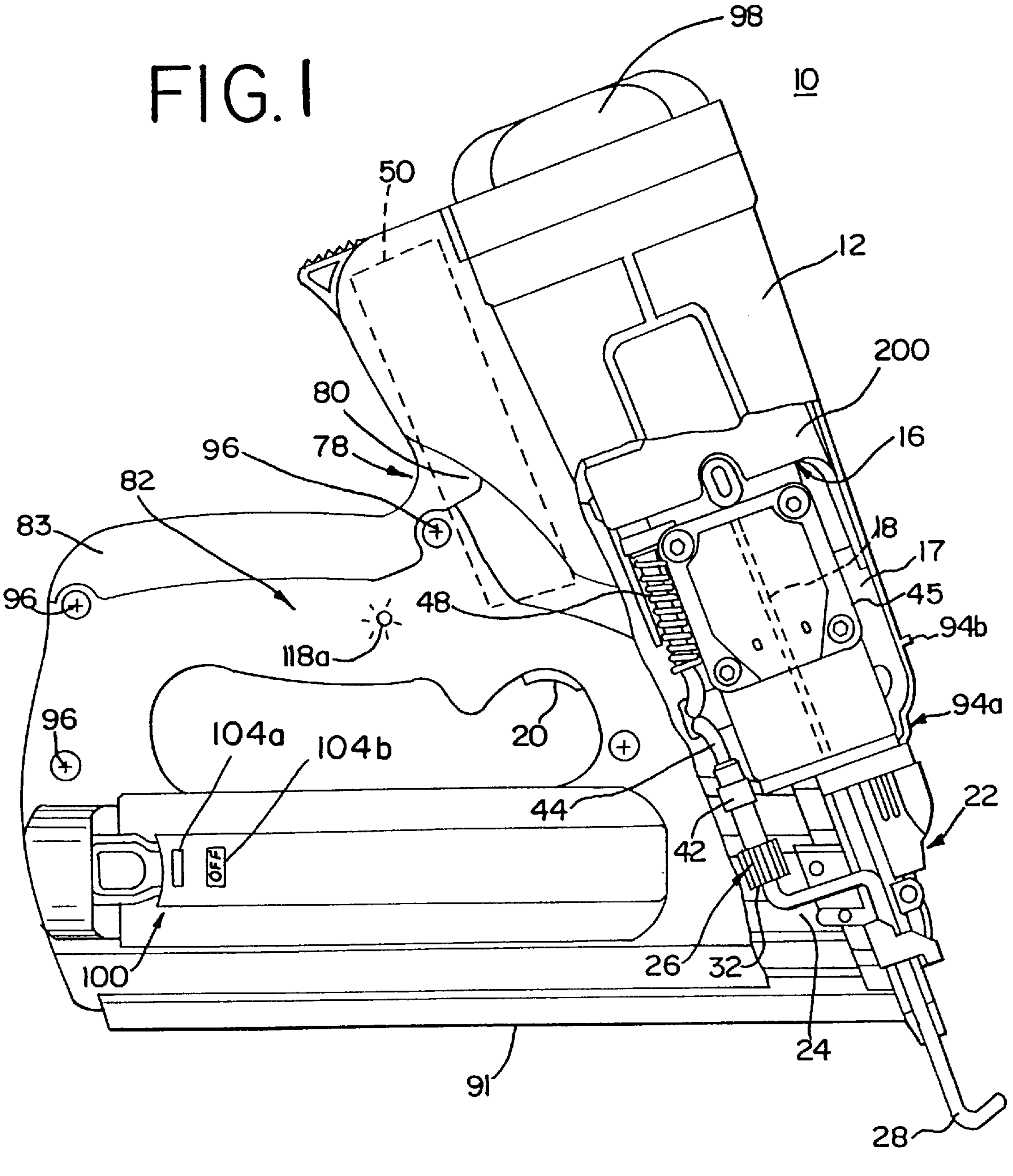
FIG. 1 is a partially cut away side view of the preferred fastener driving tool.
Figure 2:
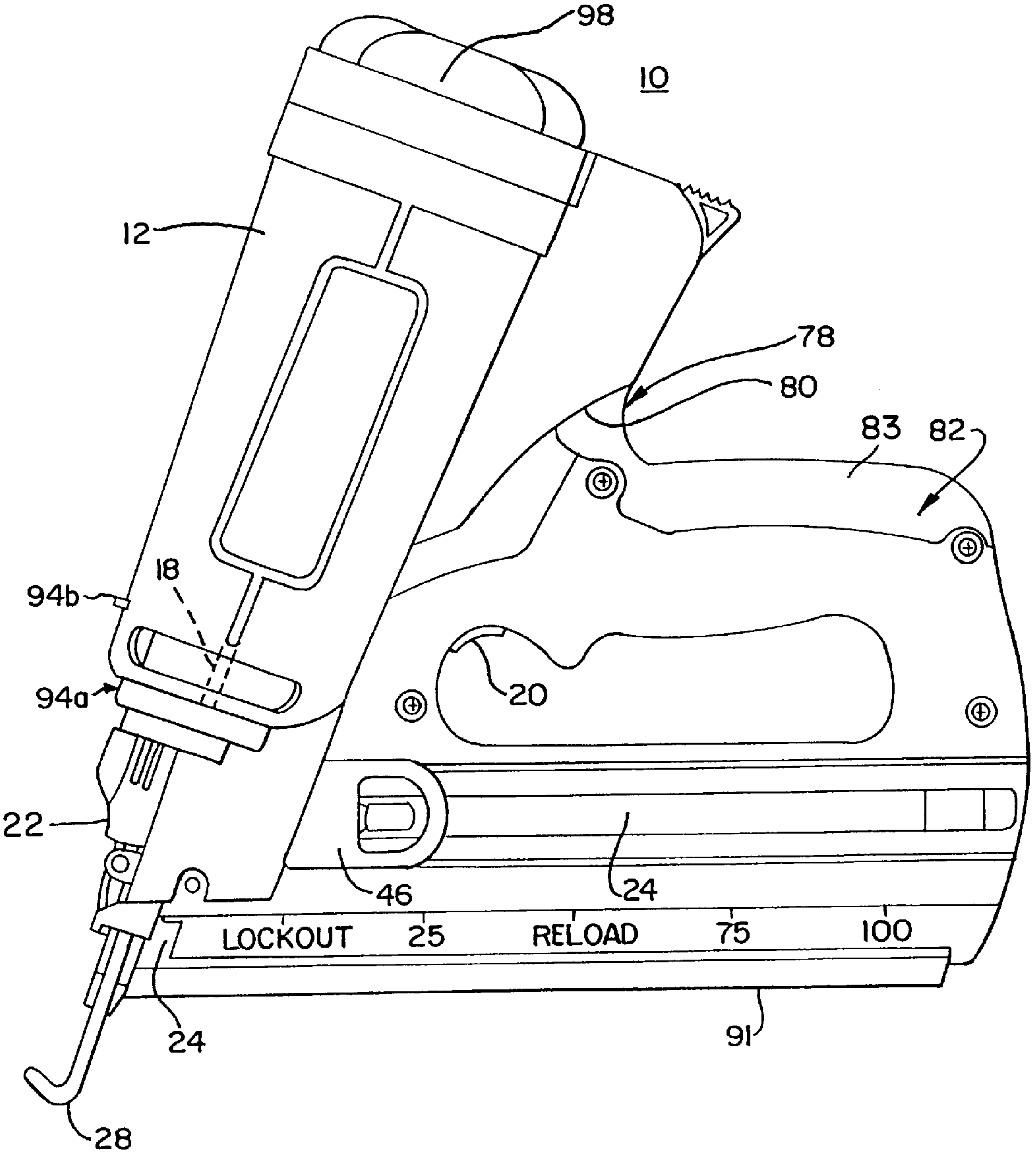
FIG. 2 is an opposite side view of the fastener driving tool of FIG. 1.

Referring now to FIGS. 1 and 2, the preferred embodiment of a compact fastener driving tool for trim applications is generally designated 10. A housing 12 of the tool 10 encloses a self contained internal power source 16 within a housing main chamber 17. As in conventional combustion tools, the power source 16 includes a combustion chamber 200 that communicates with a cylinder. A piston within the cylinder is connected to the upper end of a driver blade 18. As a result of depression of a trigger 20, an operator induces combustion of a measured amount of propellant within the combustion chamber 200, causing the driver blade 18 to be forcefully driven downwardly into a nosepiece 22. The nosepiece 22 guides the driver blade 18 so as to strike a fastener that had been delivered into the nosepiece 22 by means of a fastener magazine 24. Thus, the general operation is like that of conventional combustion fastener driving tools. From the following description of novel features of the preferred tool 10, artisans will also appreciate that many of the features of the present invention can be advantageously applied to fastener driving tools having alternate power sources, such as pneumatic and powder actuated tools.

Figure 3:
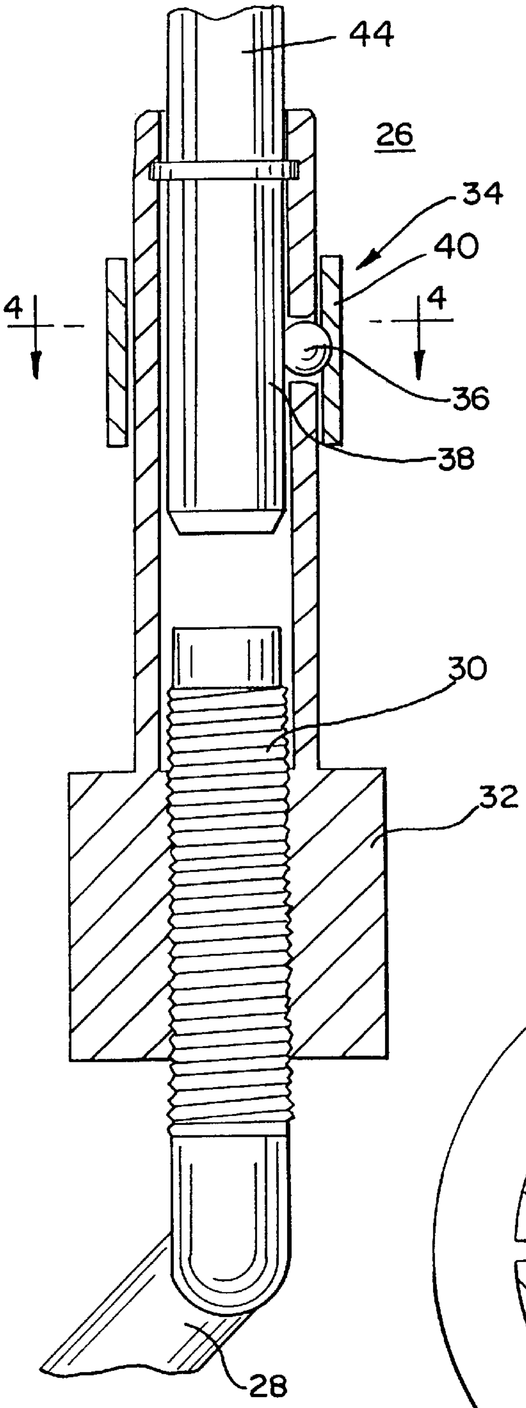
FIG. 3 is a partial cross section of an incremental drive depth controller of the preferred fastener driving tool.
Figure 4:
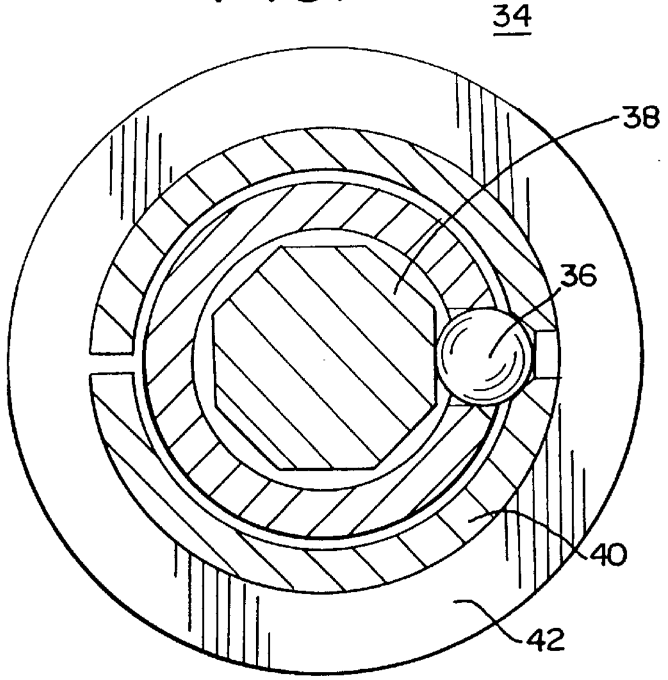
FIG. 4 is a section taken at line 4—4 in FIG. 3.

An important feature of the preferred tool 10 is its ability to provide discrete and repeatable depth control adjustment. Referring now to FIGS. 1, 3 and 4, an incremental controller for providing a discrete number of repeatable fastener driving depth settings is generally designated 26. The incremental controller 26 cooperates with a fastener drive probe 28, and permits a user to adjust the relative relationship between the drive probe 28 and the nosepiece 22 over a limited range. The limited range is defined by threads 30 disposed upon an upper end of the drive probe 28. An operator rotates a knob 32 so as to move the drive probe 28 inwardly and outwardly. The range of movement is divided into a discrete number of selectable positions by an incrementer 34.

The incrementer 34 preferably comprises a detent 36, for example a ball bearing, that cooperates with a nonrotating polygonal surface 38. The polygonal surface 38 shown in FIGS. 3 and 4 is octagonal, having the effect of dividing each full rotation of the knob 32 into eight discrete and repeatable settings. The detent 36 is mounted within an upstanding sleeve portion 37 of knob 37 of knob 32 and is preferably spring loaded by means of a spring clip 40 held on by a sleeve 42 so as to frictionally engage the polygonal surface 38. An operator feels and may hear "clicks" indicating distinct positions as the knob 32 is rotated. Numbers or other indicia may be used in conjunction with the knob 32 and/or the lower end of the probe 28 so as to assist in the selection of the repeatable discrete positions. In a preferred embodiment, “flush” and “deep” are on a portion of the housing near the knob 32. In addition, the drive probe 28 preferably includes a notch which aligns with a lower portion of the nosepiece 22 when the drive probe 28 is set to a flush drive depth. The polygonal surface 38 may be formed as an integral part of a linkage member 44 used to link the drive probe 28 to the combustion chamber 200 which seals with the cylinder head (not shown) of the power source 16. Alternatively, the polygonal surface 38 may be formed from a bent wire or member wrapped around a portion of the linkage member 44.

Another important feature of the invention concerns the preferred tool’s ability to disable firing in response to the discharge of a single small fastener, such as those typically used in trim applications. As seen in FIG. 2, a fastener follower 46 rides in a portion of the magazine 24 and moves an amount equal to the diameter of a fastener after a fastener has been driven by the driver blade 18. For example, typical finishing brads loaded into a magazine move in increments of about 0.060" (1.5mm). This provides insufficient movement to block movement of components that enable firing of the tool. Specifically, the drive probe 28 typically has a diameter of about 0.156".

In the tool 10, the primary components which enable combustion (see FIG. 1) include the drive probe 28, linkage 44, combustion chamber 200, valve sleeve 45, and a cylinder head which is not shown. A spring 48 biases the linkage 44, and accordingly the probe 28, downwardly. In this state, the tool 10 is disabled from firing because the combustion chamber 200 is not sealed at the top with the mating unshown cylinder head. Firing is enabled when an operator presses the drive probe 28 against a workpiece. This action overcomes the spring force, causes the combustion chamber 200 to move upwardly about the valve sleeve 45 and seal the combustion chamber 200 by mating with the cylinder head, and also induces a measured amount of propellant to be released into the combustion chamber 200 from a fuel canister 50. As is known in the art, other actions may be initiated by the pressing of the drive probe 28, such as the actuation of a fan to help combustion and the loading of a fastener into the nosepiece 22 from the magazine 24.

Figure 6:
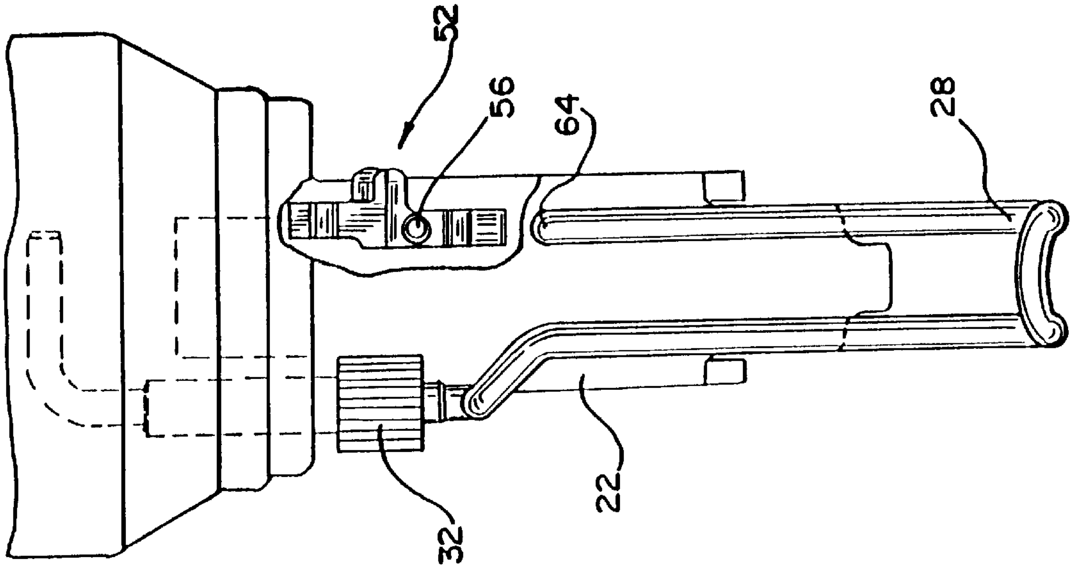
FIG. 6 is a partially cut away alternate view of the portion of the preferred tool including the distance amplifying lockout.
Figure 5:
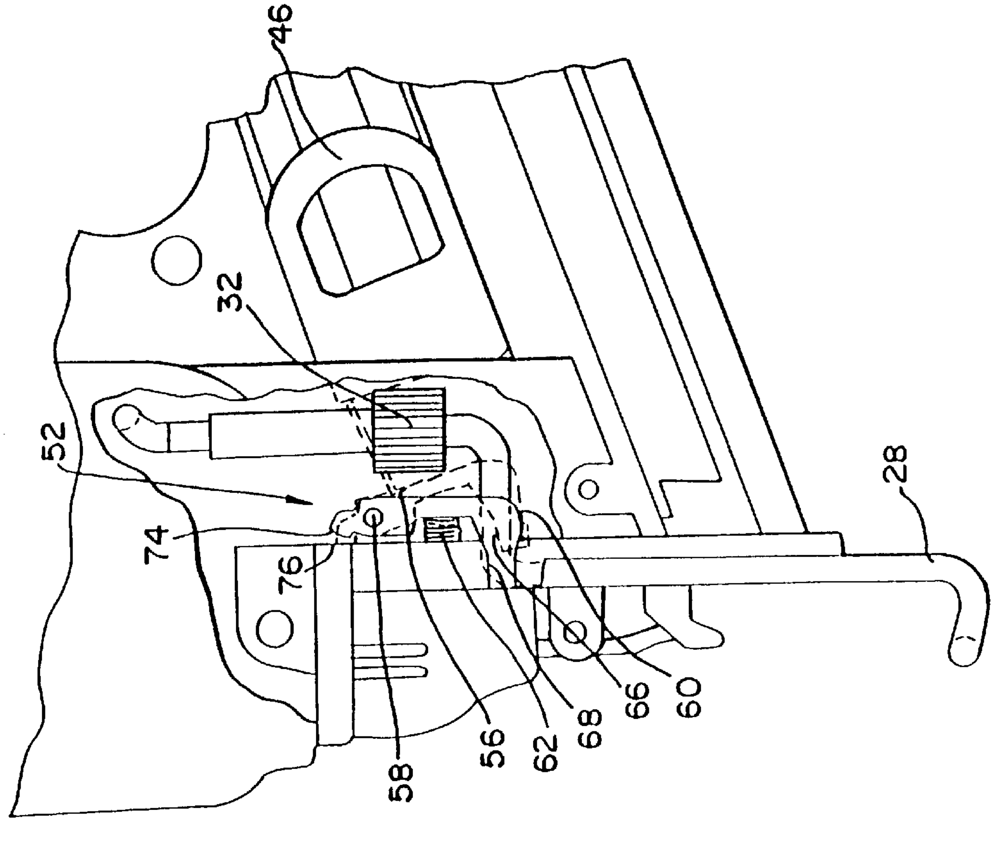
FIG. 5 is a partially cut away side view of a portion of the preferred tool including a distance amplifying lockout.
Figure 7:
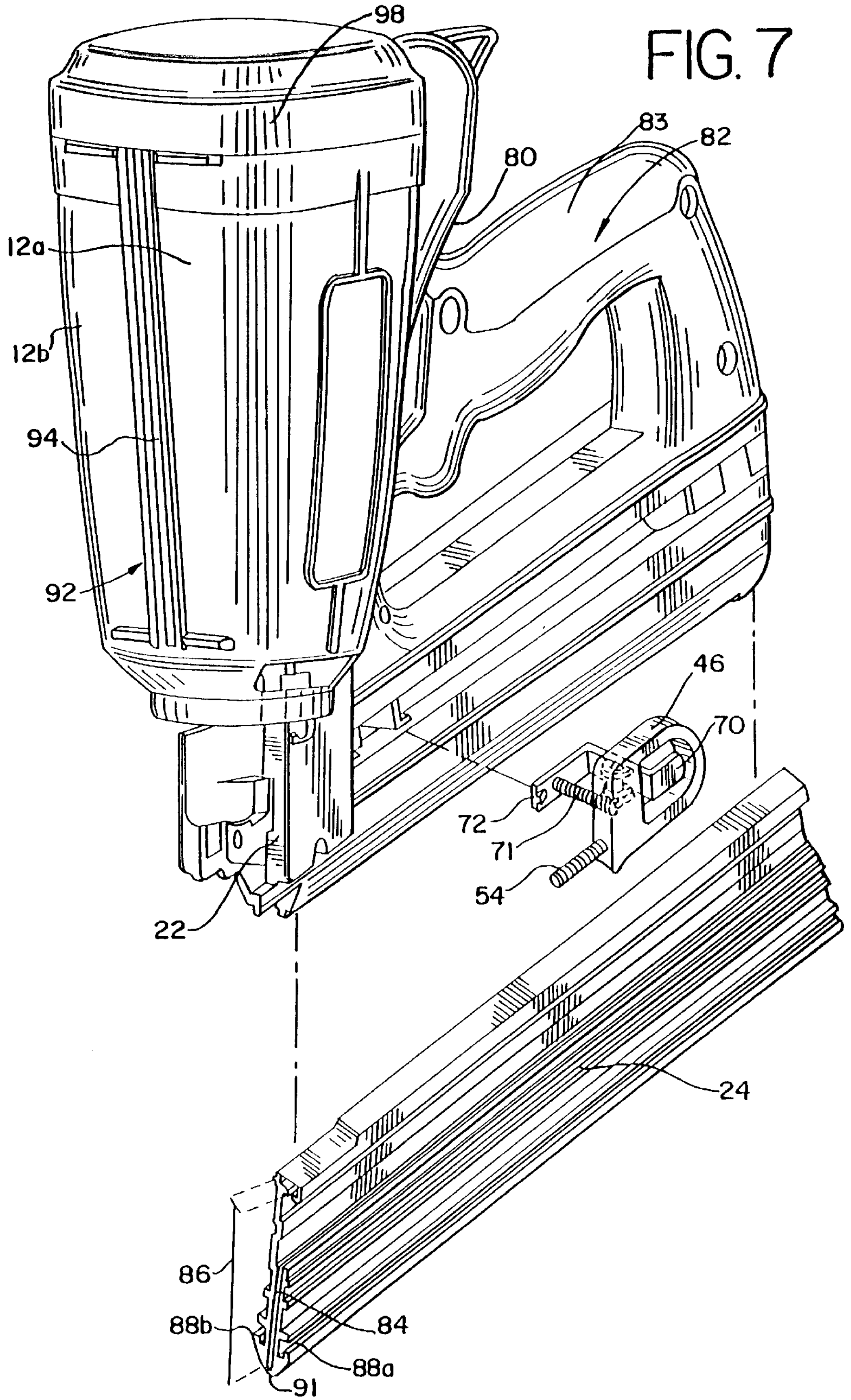
FIG.7 is a perspective relational view of the preferred tool, a preferred fastener magazine and a preferred fastener follower.

Referring now to FIGS. 5–7, there shown is a distance amplifying lockout 52 that amplifies the movement of the fastener follower 46 after a rod 54 contacts its contact point 56, which is located between its pivot mounting 58 and its engagement end 60. The rod 54 is preferably flexible so as to aid in assembly when housing halves 12*a* and 12*b* are brought together (see FIG. 8). The rod 54 must be flexible enough to bend over the distance amplifying lockout 52. It will either bend into place at the contact point 56 when the housing halves 12*a* and 12*b* are brought together or after the fastener follower 46 is pulled back for the first time. The contact point 56 is located near the axis of rotation defined by the pivot mounting 58 so that further movement of the rod 54 after contacting the point 56 produces an amplified movement of the engagement end 60. In the illustrated embodiment, a 0.060" movement at the contact point 56 created by the discharge of a single trim fastener is translated into a 0.200" movement of the engagement end 60. The pushing of the rod 54 at the contact point 56 overcomes a light spring force supplied by a light spring 62 so as to move the engagement end 60 into a position which will block a terminal end 64 of the probe 28 from moving upwardly. As is best seen in FIG. 5, the engagement end 60 is preferably shaped so as to accommodate the terminal end 64 of the probe, and an opposite surface 66 mates with a solid (preferably steel) portion 68 of the tool 10. The opposite surface 66 jams solidly against the solid portion 68, while the curve in the engagement end 60 draws the lockout 52 inwardly after it engages the terminal end 64, thereby ensuring engagement of the full diameter of the probe 28. This reinforced position of the engagement end 60 along an axis of movement of the terminal end 64 of the probe 28 will oppose significant forces applied by an operator trying to actuate the tool 10, and provide a clear indication that the magazine 24 is low or has been emptied of fasteners. As will be appreciated by artisans, it is a matter of design choice to determine the number of fasteners remaining when the lockout 52 is actuated. Such adjustments may be accomplished, for example, by altering the length of the rod 54.

It has been mentioned that the rod 54 must be resilient enough to bend out of the way of lockout 52 when the halves 12 and 12*b* of the housing are rotated together. Other factors are also important with respect to the magazine 24, follower 46 and lockout 52. First, the follower 46 should contact a portion of the housing before the lockout 52 is pushed to a breaking point. This protective position is illustrated in FIGS. 2 and 5. This protects the lockout 52 from accidental breakage when an operator accidentally allows the follower 46 to slam back toward the lockout 52. Second, at the point of disabling, the follower 46 should maintain light pressure on remaining fasteners. Thus, the housing 12 should not be contacted by the follower 46 at that point, which is when ten fasteners remain in a preferred embodiment. In other words, after the eleventh remaining fastener, for example, is shot, the rod 54 activates the lockout 52 while maintaining pressure on the tenth brad so as to keep the remaining brads in position.

Once the operation is prevented, an operator may pull back the fastener follower 46 to move it back along the magazine 24 so that more fasteners may be loaded into the magazine 24. It is a bypass type follower, so a bar 70 and associated spring 71 pivotally control a fastener engager 72 so that it will travel over fasteners in the magazine 24 on the way back, or travel over fasteners on the way forward when an operator presses the bar 70. When bar 70 is released and the follower 46 is behind a group of fasteners, the engager 72 will engage the rearmost fastener upon meeting it. A constant force negator spring (not shown) is rolled into a molded pocket within the housing 12, and exerts a force so as to pull the fastener follower 46 toward the nosepiece 22 and cause the engager 72 to engage the rearmost fastener within the magazine 24. After lockout, the operator overcomes this force to pull the fastener follower 46 back, and the distance amplifying lockout 52 is moved to a resting position through force supplied by the light spring 62. The resting position is defined by a stop end 74 of the lockout 52, which abuts a solid portion 76 of the tool 10.

The preferred tool 10 also provides balance and maneuverability, which reduce user fatigue and permit precision handling of the tool. Referring primarily to FIG. 1, with further views included in FIGS. 2 and 7, the trigger 20 of the present tool is proximate to the axis defined by the driver blade 18. Proximate, as used herein, means that the trigger 20 is very near the cavity of the housing 12 that includes the power source 16. This is accomplished through a unique handle, grip, and fuel canister arrangement 78.

The housing 12 includes a curvature 80 that permits a handle 82 to extend up to the portion of the housing 12 which accommodates the power source 16. The curvature 80 also provides a comfortable and stable gripping location. Overall, the handle 82 is shaped to accommodate the shape of an operator's hand, as best seen in FIG. 7. Unlike conventional combustion tools, the handle 82 partially wraps around, and the trigger 20 is completely under, the fuel canister 50.

A significant result of the assembly 78 is that the trigger 20 may be disposed near the tool's center of gravity. This trigger and handle position, within an imaginary extension of the fuel canister 50, provides enhanced operation since the user will not have to oppose the tendency of the tool to tip, as in tools which must be gripped at other locations. Compared to such other locations, the trigger and handle position of the present tool 10 also reduces recoil felt by an operator during operation since the moment imparted to an operator's wrist is reduced by virtue of the shorter moment arm created by the novel trigger position. In previous combustion tools, the handle and grip ended at a position adjacent to the fuel canister or its imaginary extension, causing a larger moment to be imparted to an operator's wrist. Further comfort may be provided by an elastomeric portion 83 formed at the top of the handle 82. This portion 83 will reduce shock imparted to an operator's hand during tool operation. The trigger 20 preferably includes a similar elastomeric portion. These combine to reduce the shock to an operator's hand during operation.

Figure 8:
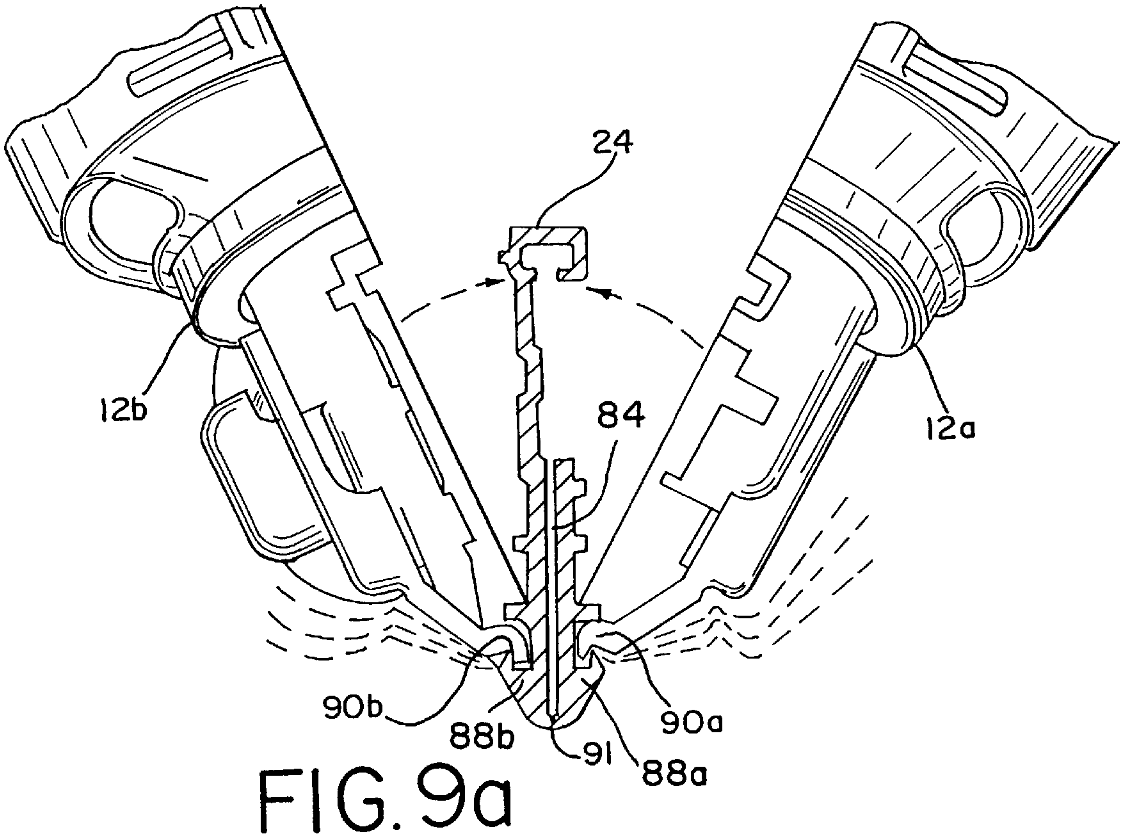
FIG. 8 is a view which shows a portion of the preferred tool and magazine in an uncompleted assembly state.
Figure 9A:
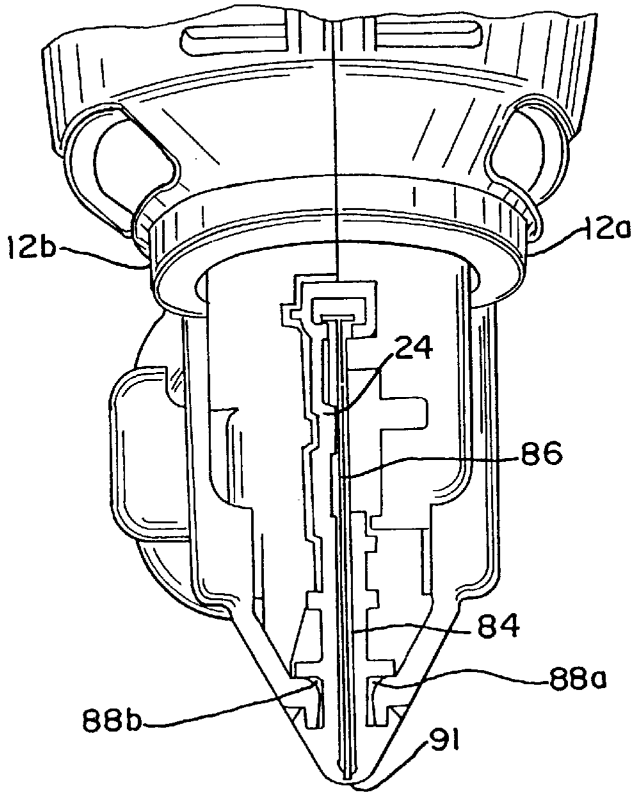
FIG. 9*a* is a view which shows the portion of the preferred tool in FIG. 8 in a completed assembly state.

Fastener delivery of the present tool 10 is rendered more reliable by the magazine structure depicted in FIG. 7, and by the associated manner of assembly depicted in FIGS. 8 and 9. The magazine 24 serves as a primary assembly member for the two halves 12*a* and 12*b* of the housing 12, and extends into the nosepiece 22 in the completed assembly state. This serves to unify alignment of the fastener delivery path, defined by a fastener channel 84, since a fastener 86 is ejected directly from the magazine 24 to a point in the nosepiece 22 that is along the driving axis defined by the driver blade 18.

The magazine 24 includes opposite ribs 88*a* and 88*b* which accept and lock corresponding tooth portions 90*a* and 90*b* of the housing halves 12*a* and 12*b*. The bottom 91 f the magazine 24 is rounded and closes the fastener channel 84 so as to prevent the sharp ends of the fasteners from being exposed outside the tool 10.

Figures 9B, 9C:
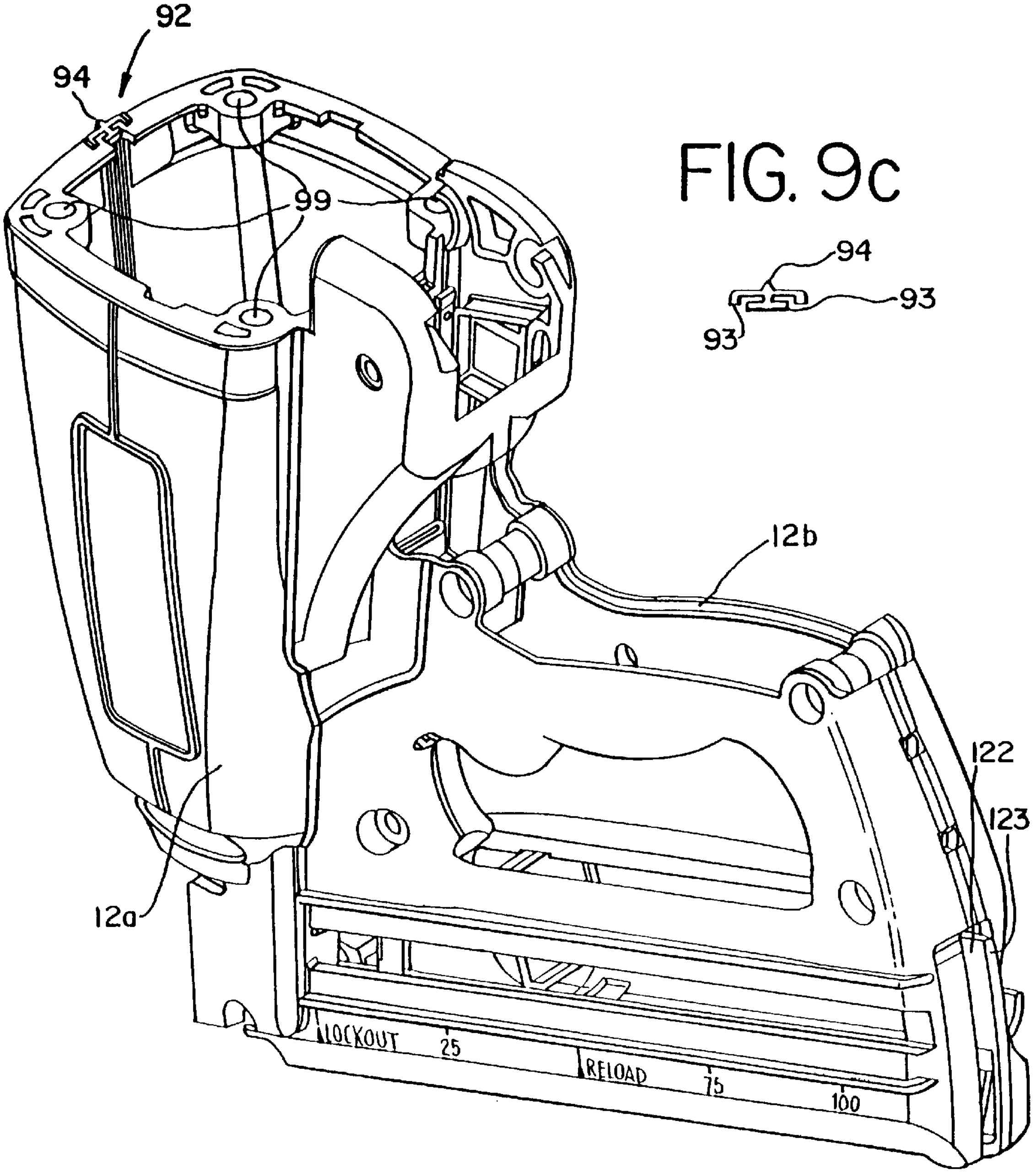
FIG. 9*b* is a view which illustrates a completed front assembly of the preferred tool of FIG. 8.
FIG. 9*c* is a top view of a joining element from FIG. 9*b*.

A separate elongated joining element 92 includes locking channels 93 (FIGS. 9*b* and 9*c*) similar to those on the magazine, and serves to lock corresponding portions of the housing halves 12*a* and 12*b* along the front of the tool 10. The joining element 92 includes an alignment sight 94. The alignment sight 94 is generally parallel to the driver blade, angling with the housing 12 somewhat inward toward the nosepiece 22, and provides an aid to an operator attempting to align the tool 10 with precision over a workpiece. As illustrated in FIGS. 9*b* and 9*c*, the sight 94 comprises a rib formed on the length of joining element 92. After the halves 12*a* and 12*b* are brought together and locked by the magazine 24, the joining element 92 is slid down to lock the halves 12*a* and 12*b* at the front of the tool 10. Best seen in the top view of FIG. 9*c*, the locking channels 93 hold the two halves together along the front of the tool 10. The sighting might also include a rifle tab 94*a* and alignment aid 94*b* instead of the rib (as shown in FIGS. 1 and 2). In such case the tab 94*a* is preferably formed on the housing 12 and the aid 94*b* at a lower portion of the joining element 92 (see FIGS. 1 and 2).

Assembly is completed by a number of recessed screws 96 in the handle area (see FIG. 1), and a bolted-on cap 98. Bolt holes 99 (FIG. 9*b*) hold the bolts. Any similar fastening element may replace the screws, including but not limited to bolts or direct snap together members. The cap 98 includes air openings, and a screen and grill are preferably used to filter and protect the openings. Such a grill may snap onto the cap 98 and lock an intervening screen into place. The screen may include a gasket around its circumference. This arrangement facilitates occasional replacement of the screen. The cap 98, joining element 92, and magazine 24 provide rigidity and alignment not accomplished by mere point fastening arrangements, while also reducing part count and simplifying assembly. These assembly members are preferably formed of hard plastic so as to reduce tool weight.

Part count is also reduced by the absence of an electrical on/off switch. This is common to many low cost tools that rely on batteries for some form of electric power. However, the present tool 10 includes a unique battery holder 100 (see FIGS. 1 and 10–12) having separate locked operational and standby positions, permitting an operator to effectively turn the tool off by disconnecting the battery supply, while simultaneously locking the battery holder 100 in place so as to avoid having it fall out.

Figure 10:
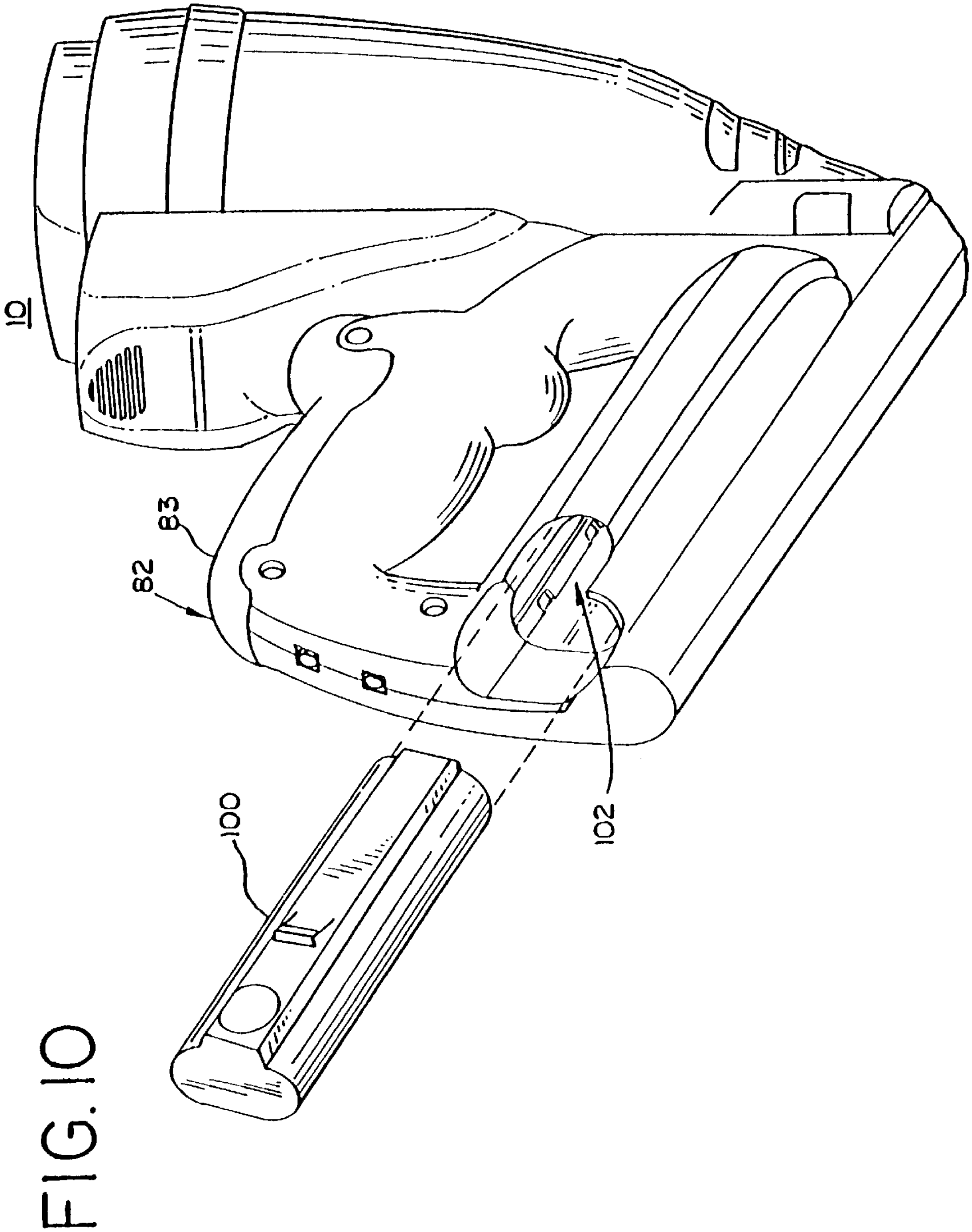
FIG. 10 is a perspective partially exploded view illustrating the preferred tool and its battery holder.

As seen in FIG. 10, the battery holder 100 may be removed from a hollow portion 102 of the handle 82. As in typical tools including battery holders, the battery holder 100 includes contacts to contact electrical elements in the tool, so that necessary power can be delivered to tool circuitry. However, the battery holder 100 and hollow portion 102 also provide a locked non-operational position, shown in FIGS. 11 and 12, where such electrical contact is not made so as to thereby electrically disable the tool 10.

Specifically, separate holes 104*a* and 104*b*, which also might be mere depressions, are provided for accommodating a biased tooth 106 of the battery holder 100. The tooth 106 preferably includes a sloped leading edge 108 to facilitate sliding of the holder 100 into the hollow portion 102, which includes a corresponding slope 110. Once the tooth 106 reaches the first depression 104*a* it pops into the depression 104*a* and locks the holder 100 into the nonoperational position shown in FIG. 12. In that position battery holder contacts 112 are separated from tool contacts 114 so that the batteries 116 cannot supply electricity through contacts 112 and 114 to tool power circuits that are electrically connected to contacts 114. In this position, the tool 10 can be placed in any orientation without worry that the battery holder 100 will fall out. Accordingly, inconvenience and potential injury are avoided while a switchless manner of electrically disabling the tool is provided.

Figure 11:
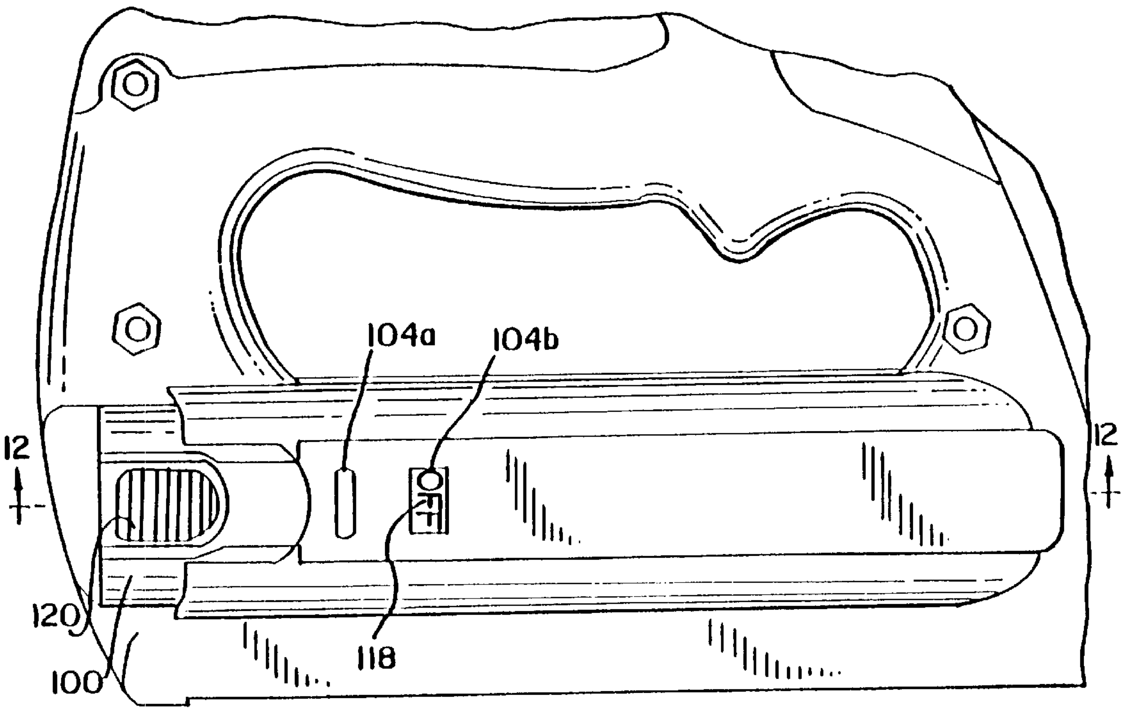
FIG. 11 is a partial side view of the battery holder mounted in the preferred tool in a locked standby state.
Figure 12A:
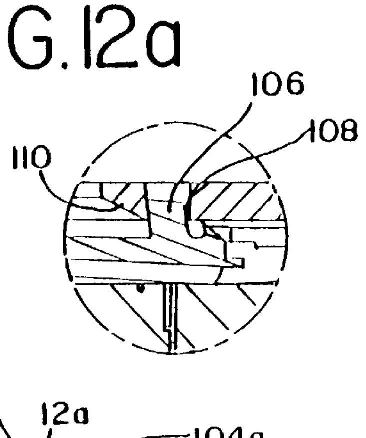
FIG. 12*a* is an enlarged view of the circled portion of FIG. 12.
Figure 12:
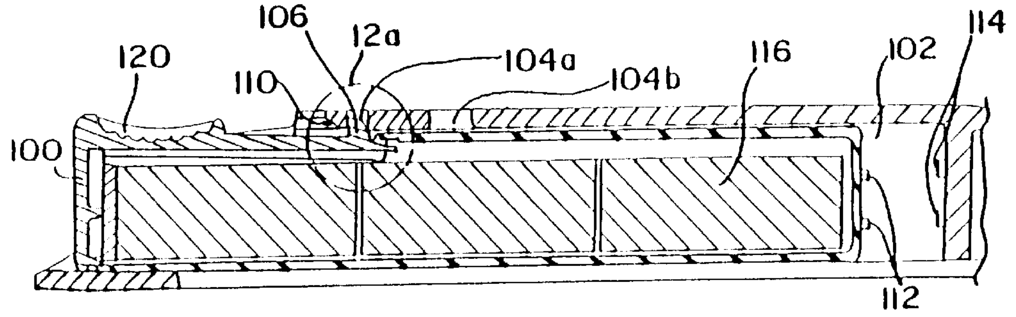
FIG. 12 is a section taken along line 12—12 in FIG. 11.

An indication 118, such as "off", may also be provided to indicate the tool's state of readiness. In FIG. 11, the indication simply takes the form of lettering on the surface of the battery holder 100. The "off" lettering becomes aligned with the hole 104*b* when the tooth 106 is in the hole 104*a*. Alternatively or additionally, an LED indicator 118*a* (see FIG. 1) might be used to indicate tool readiness when the holder 100 is in a separate locked operational position.

An operator moves the battery holder 100 into the separate locked operational position by depressing a tab 120 so as to overcome the upward bias of the tooth 106. Once the tooth 106 is released from the hole 104*a,* the battery holder 100 may then be slid forward until the contacts 112 contact the contacts 114 and the tooth 106 clicks into the hole 104*b*. An indication, such as "on", may also be provided in this locked operational position, through hole 104*a,* or through the LED 118*a,* or through other suitable means.

Figure 13:
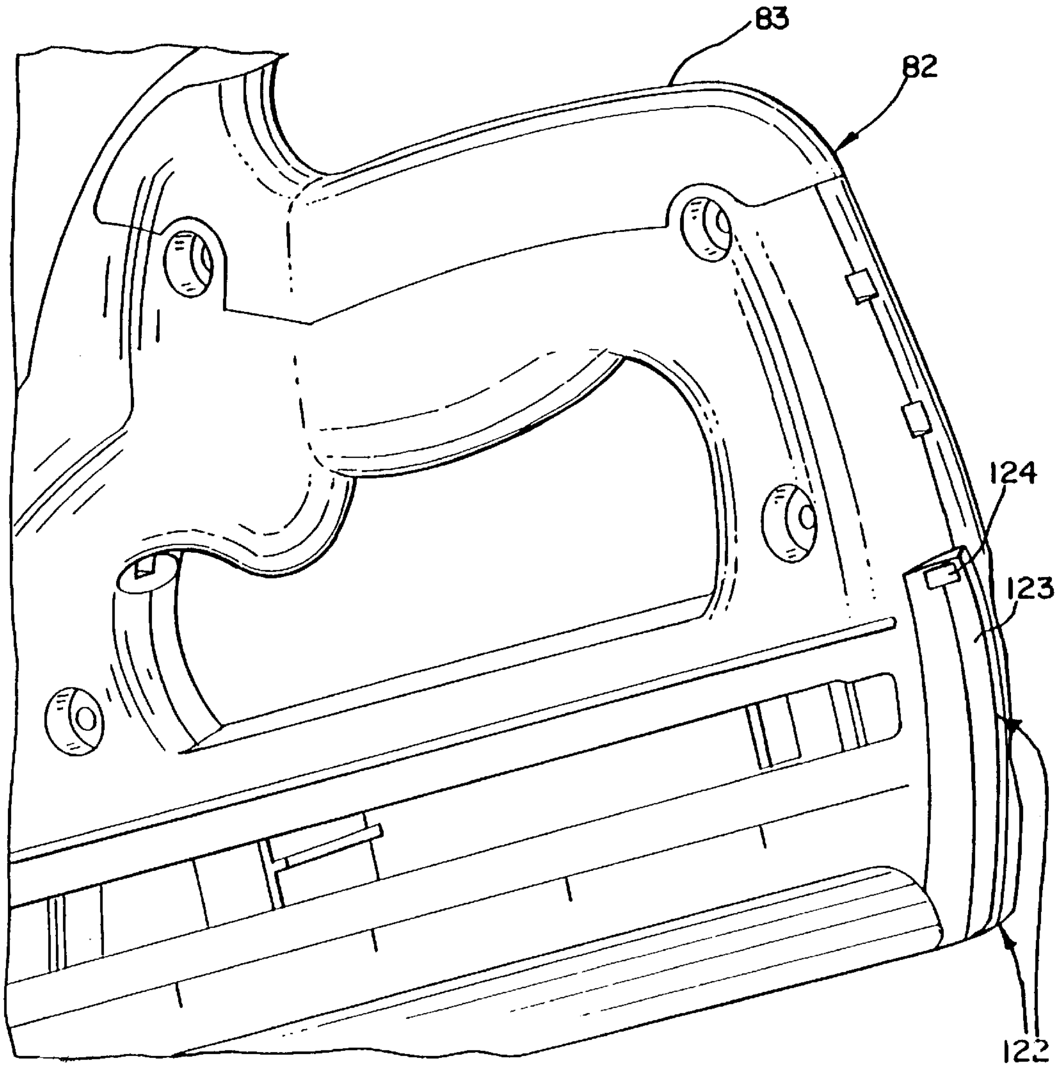
FIG. 13 is a perspective view of a portion of the preferred tool showing its fastener loading shelf.

The small sized trim fasteners for use with the preferred tool may be difficult to load into the magazine 24, even when they are bundled together in groups of multiple fasteners in a fashion similar to groups of staples. The preferred tool 10 renders loading easier through provision of a shelf 122. The shelf 122 as seen in FIGS. 9*b* and 13 is preferably formed as an extension of one of the housing halves 12*a* or 12*b* and preferably includes an angled portion 123. As seen from FIG. 13, the shelf 122 and angled portion (also shown in FIG. 9*b*) will serve as a guide to guide fasteners into a fastener opening 124 that leads to the fastener channel 84 of the magazine 24.

As described above with reference to the drawings, features of the present invention provide for an improved fastener driving tool for trim applications. While the preferred embodiment is a combustion tool, artisans will appreciate that features of the present invention might also be individually or severally applied to other tools, such as battery powered electric tools, pneumatic tools, and powder actuated tools. Thus, while a particular embodiment of the invention has been shown and described, it will be appreciated by those skilled in the art that changes and modifications may be made thereto without departing from the invention in its broader aspects and as set forth in the following claims.

What is claimed is:

1. A powered tool constructed to drive a driver blade along an axis in response to power from a power delivery source so as to impact a fastener and drive said fastener into a workpiece, comprising:

a housing having a main chamber enclosing said power delivery source;

a nosepiece associated with said housing so as to accept a fastener and axially guide said driver blade toward impact with said fastener;

a handle;

a trigger permitting an operator to actuate said power delivery source;

a fastener supply assembly associated with said housing for supplying fasteners into said nosepiece;

an elongated hollow portion provided within said housing and having a longitudinal extent;

power contacts for said tool disposed within said elongated hollow portion of said housing; and a battery holder, housing an electrical power supply battery, movably disposed, in a substantially longitudinal manner within said elongated hollow portion of said housing, between a first locked operational position at which battery contacts are electrically connected to said power contacts of said tool so as to supply electrical power to said tool, and a second locked standby position at which said battery contacts are electrically disconnected from said power contacts of said tool so as to operatively disable said tool while said battery holder, and said battery, are lockingly retained within said hollow portion of said housing of said tool.

2. The tool as defined in claim 1, wherein:

said battery holder is accommodated within a portion of said handle.

3. The tool as defined in claim 1, wherein:

said housing includes separate operational and standby depression; and said battery holder comprises a biased tooth for respective insertion within either one of said operational and standby depressions so as to lock said battery holder at a selected one of said operational and standby positions with respect to said housing.

4. The tool as defined in claim 1, wherein said battery holder further comprises an indicator which is viewable when said battery holder is in said standby position.

5. The tool as defined in claim 1, wherein said battery holder further comprises an indicator viewable when said battery holder is in said operational position.

6. The tool as defined in claim 1, wherein:

said battery holder further comprises indicator devices for indicating when said battery holder is respectively in said operational and standby positions.

7. The tool as set forth in claim 6, wherein:

said indicator devices comprise LED lights.

8. The tool as set forth in claim 6, wherein:

said indicator devices comprise word indicia.

9. The tool as set forth in claim 1, wherein:

said housing comprises at least two separate housing sections; and said fastener supply assembly includes a magazine which comprises rib members for engaging portions of said at least two housing sections so as to hold said at least two housing sections together.

10. The tool as set forth in claim 9, wherein:

a first one of said at least two separate housing sections is larger than a second one of said at least two separate housing sections such that said first one of said at least two separate housing sections extends beyond said second one of said at least two separate housing sections so as to define a shelf member for assisting the loading of said multiplicity of fasteners into said magazine.

11. The tool as set forth in claim 9, wherein:

an elongated joining element is disposed substantially parallel to said driver blade axis for holding said at least two separate housing sections together.

12. The tool as set forth in claim 11, wherein:

said elongated joining element comprises an alignment sight viewable by an operator when said tool is placed in an operational position with respect to a workpiece.

13. The tool as set forth in claim 12, wherein:

said alignment sight comprises a rib.

14. The tool as set forth in claim 1, further comprising:

a tool activation linkage normally biased to an axially extended non-operational position, and movable to an axially contracted operational position when said tool is pressed against a workpiece;

a fastener follower disposed within said fastener supply assembly; and a distance amplifier lockout mechanism, movable between an inoperative position and an operative position, for amplifying movement of said fastener follower when said fastener follower is brought into contact with said distance amplifier lockout mechanism in response to ejection of an individual fastener from said tool such that said distance amplifier lockout mechanism is moved an amplified distance, relative to the distance travelled by said fastener follower as a result of said ejection of said individual fastener from said tool, from said inoperative position to said operative position so as to prevent said tool activation linkage from being moved into said operational position.

15. The tool as set forth in claim 14, wherein said distance amplifier lockout mechanism comprises:

an elongated arm pivotally mounted at a first end portion thereof upon said tool at a position adjacent to said tool activation linkage; and having a second end portion, remote from said first end portion, for movement, in response to contact of said elongated arm by said fastener follower at a location adjacent to said first end portion, from said inoperative position to said operative position at which said second end portion is disposed along the axis of movement of said tool activation linkage so as to engage said tool activation linkage and prevent said tool activation linkage from being moved to said axially contracted operative position.

16. The tool as set forth in claim 1, further comprising:

a workpiece contacting depth adjustment probe axially movable inwardly and outwardly with respect to said nosepiece over a limited range;

a threaded adjuster threadedly engaged at a first location thereof with said workpiece contacting depth adjustment probe and responsive to operator manipulation so as to axially move said workpiece contacting depth adjustment probe over said limited range; and first and second incremental controllers mounted upon said threaded adjuster at a second location of said threaded adjuster, which is remote from said first location of said threaded adjuster at which said threaded adjuster is threadedly engaged with said workpiece contacting depth adjustment probe, and cooperating together so as to divide said limited range into a discrete number of increments.

17. The tool as set forth in claim 16, wherein:

said first incremental controller comprises a polygonal surface, and said second incremental controller comprises a detent for cooperating with said polygonal surface so as to divide said limited range into a discrete number of increments.

18. The tool as set forth in claim 17, wherein:

said polygonal surface has an octagonal cross-sectional configuration so as to divide said limited range into eight increments; and said detent comprises a ball element which serially engages each one of eight surface portions of said octagonal polygonal surface as said first threaded portion of said threaded adjuster is rotated one revolution with respect to said workpiece contacting depth adjustment probe.

19. The tool as set forth in claim 1, wherein:

said tool is a combustion-powered tool.

20. The tool as set forth in claim 19, wherein:

a fuel canister, for holding fuel to be used by said power delivery source, is mounted within said housing along a predetermined axis; and said trigger is mounted upon said housing at a location which is disposed along an extension of said predetermined axis of said fuel canister, wherein said predetermined axis of said fuel canister is disposed parallel to said axis along which said driver blade is driven.

* * * * *